Jan. 13, 1942.   P. A. KINZIE   2,269,671
TUBE VALVE
Filed May 31, 1939   2 Sheets-Sheet 1

INVENTOR.
PHILLIP A. KINZIE
BY
Johnston & Jennings
ATTORNEYS

Jan. 13, 1942.  P. A. KINZIE  2,269,671
TUBE VALVE
Filed May 31, 1939  2 Sheets-Sheet 2
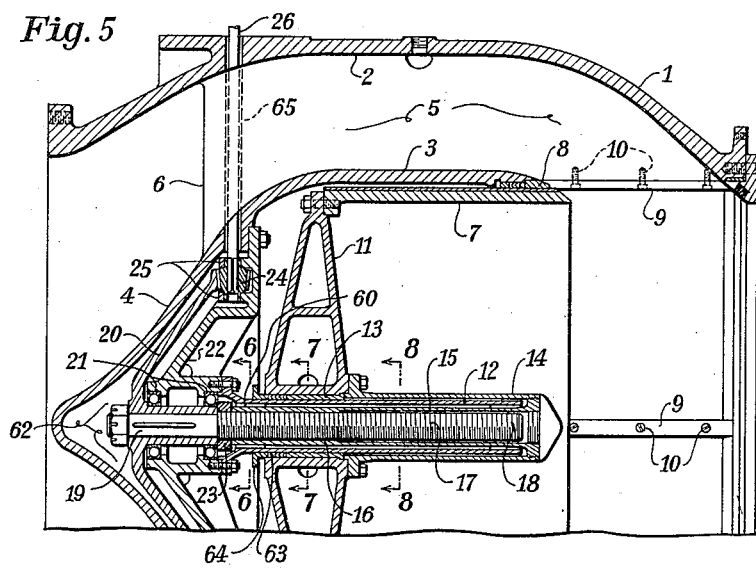
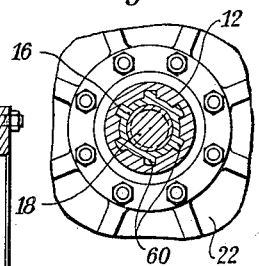
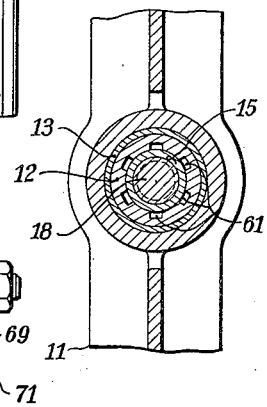
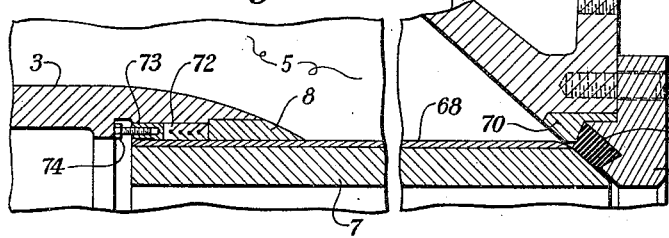
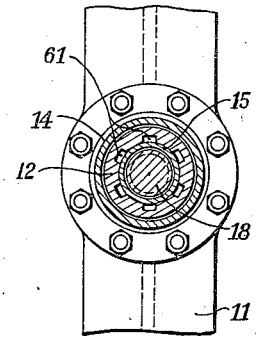
INVENTOR.
BY PHILLIP A. KINZIE
ATTORNEYS Patented Jan. 13, 1942

2,269,671

UNITED STATES PATENT OFFICE 2,269,671

TUBE VALVE

Phillip A. Kinzie, Denver, Colo.

Application May 31, 1939, Serial No. 276,593

5 Claims. (Cl. 137—139)

This application relates to improvements in hydrodynamics, sealing and actuation for valves having a tubular fluid interrupting member, contained within, and mounted coaxially with, the annular fluidway, and encompassing body member, and wherein said tubular fluid interrupting member affects opening or closing of the fluidway by longitudinal movement along the axis thereof, substantially as described by Phillip A. Kinzie and John L. Savage in an application filed February 11, 1938, Serial No. 189,976.

This application relates more specifically to an improved integration of the component elements of a tube valve, whereby the length and contour of the fluidway are better adapted to maintain a high efficiency to an improved arrangement and shaping of the closure member and adjacent cooperating portion of the valve body member whereby cavitation or erosion of the metal subjected to the blast of the high velocity fluid is avoided, to an improved means for sealing the periphery of the tubular fluid interrupting member for preventing the escape of fluid from the fluidway when the tubular member is in the closed position, to an improved integration of the internal actuating mechanism whereby the elements thereof are readily contained in an oil reservoir, and to an improved means for driving the actuating mechanism either electrically or by hydraulic pressure of the controlled fluid.

Subsequent description and explanation will clarify the manner and means by which these improvements and the following objectives are attained:

An objective of the invention is to eliminate those conical surfaces, whether curving or straight, that constitute the forward or discharge portion of the needle closure element commonly found within conventional needle valves, and thereby avoid those areas where cavitation or erosion is most commonly found in accentuated form in such valves.

The invention has as an object, a circumferential sealing means at both ends of the tubular closure member, which is contained within, and co-axial with, the encompassing body member, said means to comprise contact at one end with a resilient seating element set into the body member adjacent to the orifice and contact at the opposite end with an adjustable packing set into a counterbore in the body member.

The invention has an object, a circumferential sealing means at both ends of the tubular closure member, which is contained within, and co-axial with, the encompassing body member, said sealing means to comprise contact of both ends of the tubular member with flexible, resilient sealing elements retained on the body member.

The invention has as an object, a circumferential sealing means at both ends of a tubular closure member, which is contained within, and co-axial with, the encompassing body member, said sealing means to comprise contact of flexible, resilient seals on the tubular closure member with appropriately disposed contacting surfaces on the body member.

The invention has as an object, the arrangement means for the tubular closure member, wherein the elements are contained within, and are mounted co-axial with the valve body.

This invention has as an object, the arrangement of the longitudinal actuating elements for a tubular closure member, whereby the elements telescope within one another and permit shortening of the fluidway length through the valve with a resulting increase in efficiency.

The invention has an object, the arrangement of the actuating elements for a tubular closure member wherein all thrust and torque imposed by movement of said member is transmitted to the body member through a diaphragm member mounted integral with the body member.

The invention has as an object, the arrangement of the actuating elements for a tubular closure member whereby said elements are mounted on a diaphragm member and may be assembled or removed as a unit.

The invention has as an object, the incorporation of an integral oil reservoir which lubricates the actuating elements for the tubular closure member and which is provided with means for filling or draining from the exterior of the valve body.

The invention has as an object, a mechanical means for driving the actuating elements of the tubular closure member, said means to be located on the exterior of the valve and to be provided with an integral, mechanical overload device to prevent injury to the internal mechanism.

For the purpose of clarifying the foregoing objectives and for satisfying the patent statutes, there will now be described the specific embodiments of the invention, which have been illustrated on the accompanying drawings, forming a part hereof, and wherein:

Fig. 2 is a section taken on the plane 2—2 of

Figure 1:
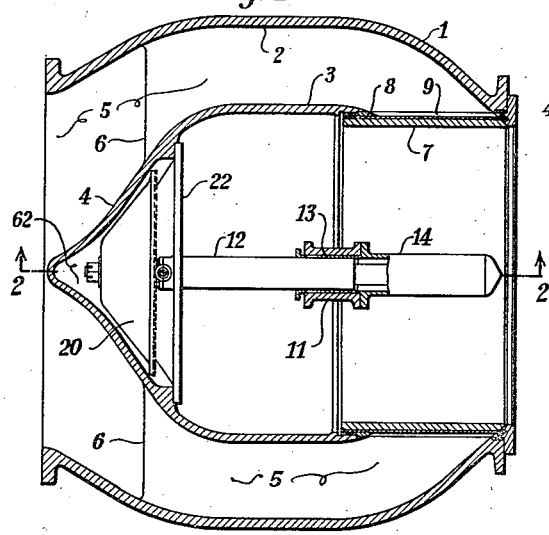
Fig. 1 is a sectional plan view and shows the valve in the fully closed position.
Figure 4:
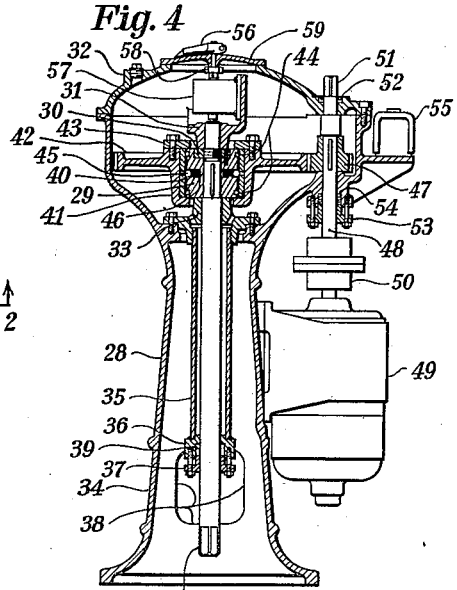
Figure 2:
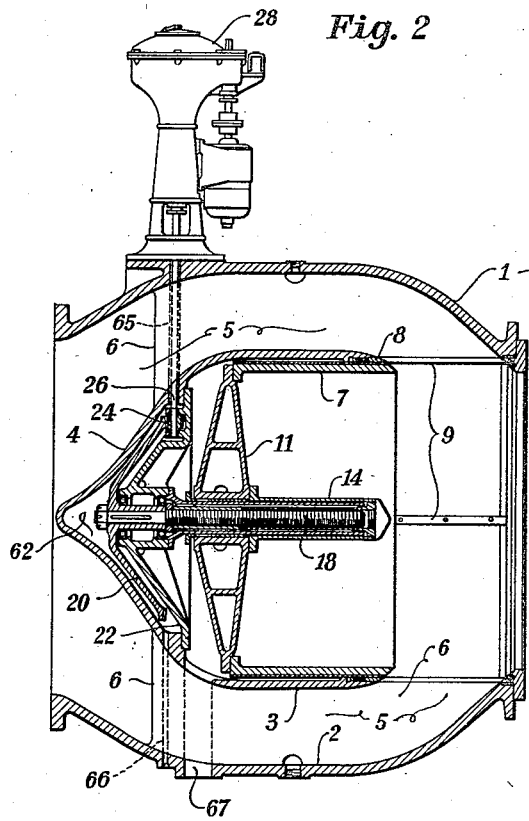
Figure 3:
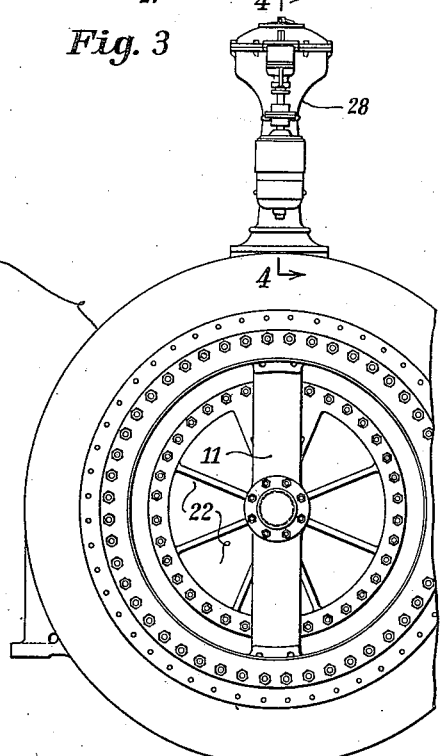

Fig. 1 and shows the valve in the fully opened position;

Fig. 3 is an end view looking upstream with reference to direction of fluid flow;

Fig. 4 is a section taken on the plane 4—4 of Fig. 3;

Fig. 5 is an enlarged portion of Fig. 2;

Fig. 6 is an enlarged section taken on the plane 6—6 of Fig. 5;

Fig. 7 is an enlarged section taken on the plane 7—7 of Fig. 5;

Fig. 8 is an enlarged section taken on the plane 8—8 of Fig. 5; and

Fig. 9 is a fragmentary section showing the disposition of the tube and sealing elements.

By reference to the accompanying drawings, it will be seen that the body 1 (Figs. 1, 2, 3, 5, and 9) is composed of the outer portion 2, the inner cylindrical portion 3, and conical portion 4, which define the contour of the annular fluidway 5, and which are connected by the longitudinal ribs 6. The closure tube 7, which is contained within the cylindrical portion 3, is supported and guided at its downstream end on the liner 8 (Figs. 2, 5 and 9) and guide strips 9, which are attached to the ribs 6 by the screws 10 and which also serve to retain the liner 9 within the counterbore in the body 1. The inner end of the closure tube 7 is attached to, and supported by, the crosshead beam 11 (Figs. 2, 3, 5 and 7) which in turn is supported on the torque tube 12 by the bushing 13. The crosshead beam 11 is attached to the thrust tube 14 which is threaded to, and locked with, the nut tube 15. The inner portion 16 of the nut tube 15 is threaded, and engages with the threaded portion 17 of the stem 18 which has the inwardly extending portion 19 bolted to, and in keyed engagement with the bevel gear 20. The ball bearings 21, which are received within counterbores in the hub of a diaphragm 22, retain the bevel gear 20 in alignment and transmit the thrust imposed on the stem 18 by motion of the closure tube 7 and the connected elements to the diaphragm 22 through the collar 23, which is threaded and welded to the stem 18, and through the bevel gear 20. The diaphragm 22 (Figs. 1, 3 and 5) also aligns and supports the bevel pinion 24, which is secured thereon by the bearings caps 25.

Rotation of the pinion 24 is imparted by the squared end on the extension shaft 26 (Figs. 2 and 3) which is coupled to the drive shaft 27 (Fig. 4) of the drive unit 28. The upper portion of the drive shaft 27 is in keyed engagement with, and is retained on the clutch trunnion member 29 by the collar 30. The drive shaft 27 is journaled in the bearing 31, formed integral with the gear case cover 32, and in the bearing 33 which is secured to the gear case pedestal 34 and to which is attached the tube 35, stuffing box 36, and gland 37. Since access is afforded to the gland 37 through the holes 38 in the gear case pedestal 34, oil tightness can be obtained by tightening the packing 39.

The bushing 40, which is retained in the hub portion 41 of the spur gear 42 by the collar 43 (Fig. 4) serves as the outer race for the balls 44, which align the spur gear 42, and is drilled to provide shallow sockets for the balls 45 which are pressed outward from within their bores in the clutch trunnion member 29 by the springs 46. Since torque is transmitted to the clutch trunnion 29 from the spur gear 42 through the balls 45, it will be apparent that, if the torque exceeds the limit of the force exerted by the springs, the balls 45 will be forced inward from their sockets and the clutch will "slip." This feature prevents overload of the elements of the internal driving parts for the closure tube 7. Other types of clutches, such as the cone, or disk would function equally well in providing this safety feature and their use as an alternate is contemplated.

The spur pinion 47, which drives the spur gear 42, is keyed on the coupling shaft 48, which is connected to the geared motor unit 49 by the flexible coupling 50. The upwardly extending end of the coupling shaft 48 has the squared portion 51 which permits manual operation of the unit in the event of power failure.

The seal ring 52 in the gear case cover 32 prevents intrusion of foreign matter into the oil reservoir while the gland 53 and packing 54 prevent escape of oil from the case.

The push button switch 55 which is mounted integral with the gear case pedestal 34 provides a convenient control station for the geared motor unit 49 while the pointer 56, which is actuated by the drive shaft 27 through the speed reducer 57 and gearing 58, gives accurate indication of position and movement of the closure tube 7 on the dial 59.

When rotation is imparted to the bevel gear 20 by the drive unit 28, it will cause the nut tube 15 (Fig. 5) which is locked against rotation by engagement of the splined elements 60 (Figs. 5 and 6) with mating splines 61 (Figs. 5, 7 and 8) in the stationary torque tube 12, to be driven outward along the threaded portion of the stem 18. Since the nut tube 15 is connected to the closure tube 7 through the thrust tube 14 and crosshead beam 11, outward motion of the nut tube will actuate the closure tube 7 along its axial center-line.

An integral oil reservoir is provided by filling with oil the space 62 between the conical portion 4 of the body 1 and the diaphragm 22, which is bolted oil tight at the periphery of its flange connection with the body 1 (Figs. 1, 2, and 5). By filling this space slightly above the top of the ball bearings 21 all of the actuating elements for the closure tube 7 will be adequately lubricated. The packing 63 (Fig. 5) which is retained by the gland 64, on the crosshead beam 11, prevents the escape of oil from around the stem and tube members and hence from the oil reservoir constituted by the space 62. The oil reservoir can be filled through the hole 65 through the vertical longitudinal rib 6 and through which the extension shaft 26 passes, while a means for drainage is provided by the hole 66 (Fig. 2).

The passageway 67 (Fig. 2) adjacent to the hole 66, is provided so that air or fluid can be admitted to the space within the interior of the closure tube, since the admission of air is beneficial in securing better discharge characteristics when the valve is operated at partially open positions. The passageway 67 can also be used as a drain for fluid collecting within the interior of the valve body when the tubular closure member is left in the closed position for protracted periods.

A method for sealing the closure tube 7 is illustrated in Fig. 9. As shown on Fig. 9, the closure tube 7, which is covered with the non-corrodible anti-friction shell 68, is rendered fluid tight at the outer end by being pressed against the resilient seat 69, which is retained at the nozzle of the body 1 by the liner ring 70 and clamp ring 71. The inner or upstream end of the closure tube 7 is rendered fluid tight by the packing 72, which is adjusted for proper pressure by the gland ring 73 and the capscrews 74. It will be noted that the packing 72 can be adjusted when the tube is in the closed position, since closure renders the capscrews 74 accessible from the interior of the tube. Since pressure on the resilient seat 69 can be properly assured by travel of the closure tube 7 to prevent escape of fluid from the annular fluidway 5, and since the packing 72 is adjustable, the means depicted provide a simple and efficient method for sealing the valve against loss of the controlled fluid.

The foregoing description outlines the means and manner through which I attain the objectives of the invention hereinbefore set forth; but whereas in the foregoing description there has been described the specific embodiments of the invention for the purpose of satisfying the patent statutes, it is, nevertheless, to be understood that in practicing the same, recourse may be made to any and all modifications falling within the scope of the appended claims defining the invention.

What I claim is:

1. In a tube valve having an annular fluidway connecting with the valve outlet, a closure tube slidably mounted inwardly of said fluidway, means to move said closure tube axially of said tube comprising a threaded stem, a nut tube on said threaded stem, a thrust tube attached to one end of the nut tube, a torque tube extending between said nut and thrust tubes, splined means to prevent relative rotation between the nut and torque tubes, a crosshead slidably mounted on the torque tube and connected to the closure tube, means connecting the thrust tube to said crosshead, and means to rotate said stem exteriorly of the valve.

2. In a tube valve having an annular fluidway connecting with the valve outlet, an inner cylindrical portion within which a closure tube is slidably mounted, means to move said closure tube axially of said inner cylindrical portion comprising a threaded stem, a bearing for said stem at one end formed by a diaphragm connected to the valve body, an oil reservoir formed between the end of the cylindrical portion and said diaphragm, means within said reservoir and connected to said stem whereby the latter may be rotated, a nut tube on the stem, a torque tube secured to the diaphragm and splined to the nut tube, said splines being in communication with said oil reservoir to permit oil therefrom to flow between said nut and torque tubes, a crosshead supporting the closure tube and slidably mounted on the torque tube, and a thrust tube connecting the nut tube to the crosshead.

3. A tube valve comprising an outer body portion, an inner cylindrical portion closed at the upstream end, a fluidway formed between the outer and inner portions and connecting with the valve outlet, a diaphragm forming an oil reservoir at the closed end of the inner cylindrical portion, a threaded stem projecting from the oil reservoir, a nut tube threaded to the stem and extending past the outer end of the stem, a torque tube substantially the length of the nut tube secured to the diaphragm and splined to the nut tube, said splines being in communication with the oil reservoir to permit oil therefrom to flow between said nut and torque tubes, a crosshead slidably mounted on the torque tube, a closure tube mounted within the inner cylindrical portion and secured to the crosshead, a thrust tube connected to the outwardly extending end of the nut tube, said thrust tube being of greater internal diameter than the external diameter of the torque tube to permit oil from the reservoir to reach the crosshead, and seal means carried by the crosshead and cooperable with the torque tube to prevent egress of oil from the reservoir.

4. The combination with a tube valve comprising an outer body portion, an inner cylindrical portion closed at the upstream end, a fluidway formed between the inner and outer portions and connecting with the valve outlet, a closure tube slidably mounted within the inner cylindrical portion, and guides for said closure tube, of seal means cooperable with the inner cylindrical portion and the closure tube comprising an annular resilient gasket, a gland ring adapted to hold said gasket in sealing position, adjusting studs projecting from the gland ring on the upstream side thereof, and a raised shoulder internally of the inner cylindrical portion against which the ends of the adjusting studs are adapted to bear, said raised shoulder being of less internal diameter than the external diameter of the closure tube and so positioned axially of the inner cylindrical portion that the adjusting studs are accessible for manipulation when the closure tube is substantially fully closed.

5. In a tube valve having an outer body portion defining an annular fluidway connecting with the valve outlet, an inner cylindrical portion closed at the upstream end, a closure tube slidably mounted in the inner cylindrical portion, a diaphragm secured to the inner cylindrical portion and defining an oil reservoir at the closed end thereof, a centrally bored hub on the diaphragm, anti-friction bearings carried in the hub, a threaded stem rotatably mounted in the bearings and projecting from the oil reservoir, gears within the reservoir for rotating the stem, a nut tube carried by the stem, a thrust tube secured to the down stream end of the nut tube, a torque tube splined to the nut tube and extending between the nut and thrust tubes, the upstream end of said torque tube being secured to the diaphragm, a collar secured to the stem adjacent the diaphragm and adapted to transmit thrust loads from the stem to the diaphragm, a cross head for the closure tube slidable on the torque tube, said hub and bearing being adapted to permit the free flow of oil from the reservoir between the nut and torque tubes and between the thrust and torque tubes, and seal means carried by said cross head and slidable on the torque tube to prevent the escape of oil from between the thrust and torque tubes.

PHILLIP A. KINZIE.